3,577,493
METHOD OF FABRICATING A GLASS FABRIC LAMINATE MATERIAL

Henry J. Lee, Cherry Hill, N.J., assignor to the United States of America as represented by the Secretary of the Navy
No Drawing. Filed Oct. 30, 1968, Ser. No. 772,012
Int. Cl. B29g 1/00, 5/00
U.S. Cl. 264—137                                            2 Claims

ABSTRACT OF THE DISCLOSURE

The present invention relates to a novel and improved method of synthesizing a polyurethane polymer which has outstanding chemical and mechanical properties and which is particularly useful as an adhesive resin in a glass cloth reinforced laminate material. The improved process utilizes the ability of aromatic polyisocyanates to dimerize and trimerize and react with a short chain aliphatic glycol under carfully controlled conditions of heat to form a unique prepolymer that is subsequently cured at a specified temperature.

---

The invention described herein may be manufactured and used by or for the Government of the United States of America for governmental purposes without the payment of any royalties thereon or therefor.

Polyurethane polymers having unique chemical and physical properties have been developed and used in the past for various purposes. Due to their thermal instability at temperatures above 350° F., however, no suitable polyurethane polymer has been synthesized heretofore for use as a resin in the fabrication of glass cloth laminate materials.

It is therefore a principal object of the present invention to provide a novel and improved method of synthesizing a unique polyurethane polymer resin for use in the fabrication of glass cloth laminate materials.

It is a further object of the invention to provide a novel and improved method of synthesizing a unique polyurethane polymer resin which is used in the fabrication of glass cloth laminate materials and which has unusual thermal stability and other outstanding chemical and physical properties.

Further objects and advantages of the invention will be apparent hereinafter.

In accordance with the invention, specified quantities of various aromatic polyisocyanates and combinations of the same, which are preliminarily dimerized and trimerized in a particular manner, are thoroughly mixed with ethylene glycol. In the mixing operation, the ethylene glycol is added into the polyisocyanate solution at a controlled rate so that the temperature of the intermixture does no exceed 140° F. The intermixture is then heated for 8–10 hours at 230° F. to form the desired prepolymer. The prepolymer is then cured by heating at 300° F. for 3–4 hours or by the addition of specified polyols, ketones and polyamides. The polymer end product having the desired physical and chemical properties is obtained by postcuring for up to 16 hours at a temperature of 310–320° F.

In preparing the prepolymer for use in the fabrication of a laminate material, a plurality of plies of glass cloth are thoroughly impregnated with the prepolymer, the plies of cloth are oriented such that the weave of adjacent plies are perpendicular to one another, and the laminate is cured in a press at 30 p.s.i. at a temperature of 300° F. for 4–5 hours.

Specific and preferred embodiment of the improved process of the invention are illustrated by the following examples:

EXAMPLE I

.4 mole of 4,4′ diphenyl methane diisocyanate was heated as rapidly as possible to 400° F. to obtain a clear translucent amber liquid. The liquid 4,4′ diphenyl methane diisocyanate was then cooled to room temperature and solid impurities therein were centrifugally removed. The 4,4′ diphenyl methane diisocyanate was the thoroughly mixed with 1.4 moles of 2,4 toluene diisocyanate. A dropping funnel was then used to slowly add .6 moles of ethylene glycol to the diisocyanate intermixture such that the temperature of the reaction product did not exceed 140° F. The reaction product was then heated for 8 hours at 230° F. The resulting polymer was a clear yellow liquid of the proper viscosity for optimum wetting of glass fabric in laminate material fabrication. At room temperature, the polymer was a clear yellow brittle solid which had an indefinite shelf life and which could be readily remelted for processing.

EXAMPLE II

.6 mole of 4,4′ diphenyl methane diisocyanate was heated as rapidly as possible to 430° F. to obtain a clear translucent amber liquid. The liquid 4,4′ diphenyl methane diisocyanate was then cooled to room temperature and solid impurities therein were centrifugally removed. The 4,4′ diphenyl methane diisocyanate was then thoroughly mixed with 1.6 moles of 2,4 toluene diisocyanate. A dropping funnel was then used to slowly add 1.0 mole of ethylene glycol to the diisocyanate intermixture such that the temperature of the reaction product did not exceed 140° F. The reaction product was then heated for 10 hours at 230° F.

EXAMPLE III

The polymer of Example I was cured by heating it for 3 hours at 300° F.

EXAMPLE IV

The polymer of Example I was cured by heating for 4 hours at 300° F. and was postcured by heating for 16 hours at 315° F.

EXAMPLE V

The polymer of Example I was cured by mixing with 1% by weight of pentaerythritol.

EXAMPLE VI

The polymer of Example I was cured by mixing with 5% by weight of catechol.

EXAMPLE VII

The polymer of Example I was cured by mixing with 5% by weight of phloroglucinol.

EXAMPLE VIII

The polymer of Example I was cured by mixing with 5% by weight of tetrahydroxybenzophenone.

EXAMPLE IX

The polymer of Example I was cured by mixing with 5% by weight of 3,3′ bis(p-hydroxyphenyl)phthalide.

EXAMPLE X

The polymer of Example I was cured by mixing with 5% by weight of benzophenone.

EXAMPLE XI

The polymer of Example I was cured by mixing with 5% by weight of 2,4,6 triaminopyrimidine.

EXAMPLE XII

The polymer of Example I was cured by mixing with 10% by weight of 4 amino 2,6 dihydroxypyrimidine.

EXAMPLE XIII

The polymer of Example I was cured by mixing with 10% by weight of diaminoanthraquinone.

EXAMPLE XIV

Twelve plies of 7" x 7" x .09" glass fabric were impregnated with the polymer of Example I so as to contain 20.5% resin. The impregnated fabric was then cured in a press at a pressure of 30 p.s.i. at a temperature of 300° F. for 4½ hours and postcured in an air circulating oven for 16 hours at 310° F.

The above described polymers and laminates were tested and found to have unusual hardness, outstanding mechanical and thermal properties and good chemical resistance. More specifically, the resin when used in the fabrication of glass reinforced laminates as described in Example XIV before and after the postcure exhibited the following specific characteristics:

|  | P.s.i. |
|---|---|
| Room temperature flexural strength | 79,535 |
| Room temperature modulus of elasticity | 4.47 |
| 350° F. flexural strength | 67,695 |
| 350° F. modulus of elasticity | 4.22 |
| Room temperature flexural strength (after the 16 hour 310° F. postcure) | 85,765 |
| Room temperature modulus of elasticity (after the 16 hour 310° F. postcure) | 4.42 |

Obviously, many modifications and variations of the present invention are possible in the light of the above teachings. It is therefore to be understood that within the scope of the appended claims, the invention may be practiced otherwise than as specifically described.

What is claimed is:

1. A method of fabricating a glass cloth laminate material using a polyurethane polymer resin adhesive, said method comprising:

(a) heating .4 to .6 mole of 4,4' diphenyl methane diisocyanate to a temperature of 400°–430° F.;

(b) cooling the 4,4' diphenyl methane diisocyanate to room temperature and centrifuging out solid impurities;

(c) thoroughly mixing 1.4–1.6 moles of another diisocyanate with the 4,4' diphenyl methane diisocyanate;

(d) adding .6–1.0 mole of ethylene glycol to the diisocyanate intermixture at a controlled rate so as to prevent the temperature of the resulting reaction product from exceeding 140° F.;

(e) heating the reaction product for 8–10 hours at 230° F.;

(f) impregnating a plurality of plies of glass fabric with the said reaction product;

(g) and curing the impregnated plies of glass fabric in a press at a pressure of 30 p.s.i. at a temperature of 300° F. for 4–5 hours.

2. The method substantially as described in claim 1 wherein the impregnated and cured plies of glass fabric are postcured at a temperature of 310°–320° F. for 16 hours.

References Cited

UNITED STATES PATENTS

| 2,642,920 | 6/1953 | Simon | 18—Glass Digest |
| 2,729,618 | 1/1956 | Mullor | 260—77.5AX |
| 3,093,160 | 6/1963 | Boggs | 264—Glass Digest |
| 3,105,062 | 9/1963 | Grahon | 264—137X |
| 3,260,010 | 7/1966 | Dubois | 264—258 |

ROBERT F. WHITE, Primary Examiner

R. R. KUCIA, Assistant Examiner

U.S. Cl. X.R.

260—77.5; 264—232, 258